(12) United States Patent
Chen

(10) Patent No.: US 9,751,588 B1
(45) Date of Patent: Sep. 5, 2017

(54) PEDAL ASSEMBLY

(71) Applicant: WELLGO PEDAL'S CORP., Taichung (TW)

(72) Inventor: Chung-I Chen, Taichung (TW)

(73) Assignee: Wellgo Pedal's Corp., Taichung (TW)

( * ) Notice: Subject to any disclaimer, the term of this patent is extended or adjusted under 35 U.S.C. 154(b) by 0 days.

(21) Appl. No.: 15/051,633

(22) Filed: Feb. 23, 2016

(51) Int. Cl.
*B62M 3/00* (2006.01)
*B62M 3/08* (2006.01)

(52) U.S. Cl.
CPC ..................................... *B62M 3/08* (2013.01)

(58) Field of Classification Search
CPC .......... B62M 3/08; B62M 3/083; B62M 3/10; B62K 23/08
See application file for complete search history.

(56) References Cited

U.S. PATENT DOCUMENTS

| 7,228,760 | B2 * | 6/2007 | Reboullet | B62M 3/086 |
| | | | | 74/594.6 |
| 8,141,456 | B2 * | 3/2012 | Chen | B62M 3/08 |
| | | | | 74/594.6 |
| 9,327,800 | B2 * | 5/2016 | Chen | B62M 3/08 |
| 9,593,993 | B1 * | 3/2017 | Chen | G01L 5/225 |
| 2011/0061491 | A1 * | 3/2011 | Chin | B62M 3/08 |
| | | | | 74/594.4 |
| 2012/0048060 | A1 * | 3/2012 | Arnold | B62M 3/08 |
| | | | | 74/594.4 |
| 2014/0251077 | A1 * | 9/2014 | Chen | B62M 3/08 |
| | | | | 74/594.4 |

FOREIGN PATENT DOCUMENTS

IT       WO 2015177693 A1 * 11/2015 .............. B62M 3/08

* cited by examiner

*Primary Examiner* — Adam D Rogers
(74) *Attorney, Agent, or Firm* — Rosenberg, Klein & Lee

(57) ABSTRACT

A pedal assembly includes an axle and a pedal. The pedal has a passage defined therein, and a shoulder is defined in the inner periphery of the passage. An engaging member is engaged with the passage and the axle rotatably extends through the engaging member. The engaging member has multiple pawls which are engaged with the shoulder to connect the pedal and the axle.

6 Claims, 5 Drawing Sheets

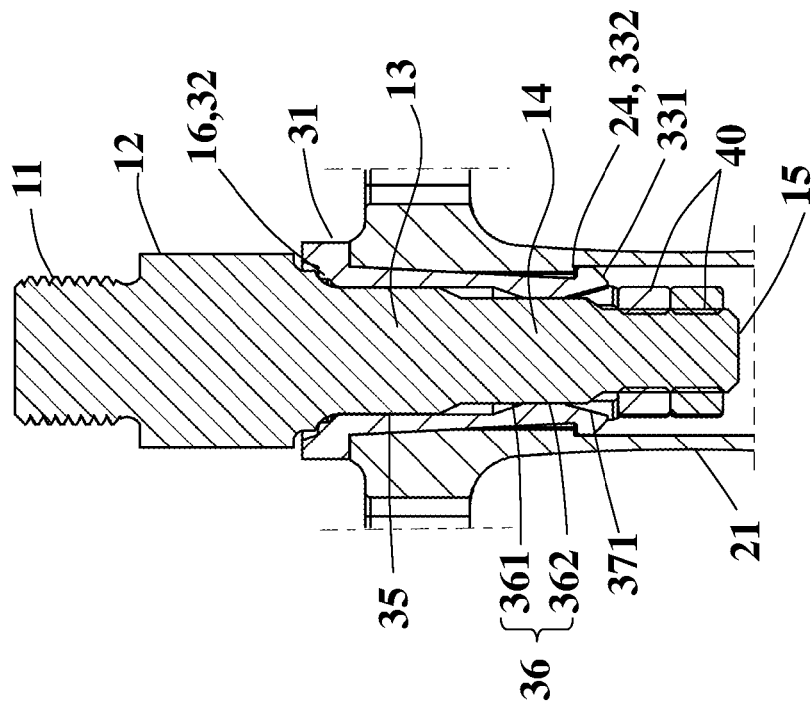
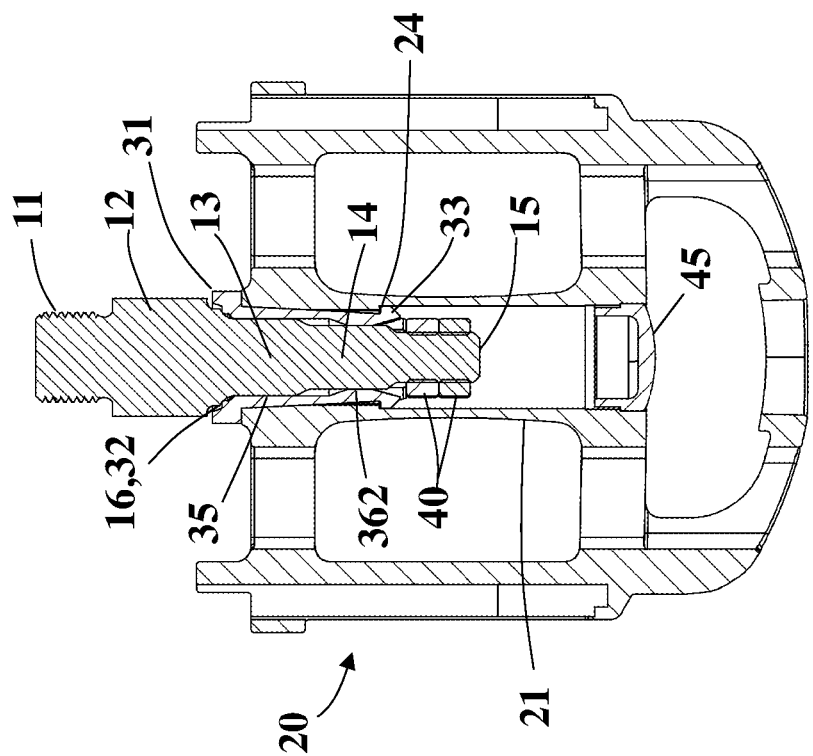
FIG. 5
FIG. 6

PEDAL ASSEMBLY

BACKGROUND OF THE INVENTION

1. Fields of the Invention

The present invention relates to a pedal assembly, and more particularly, to an engaging member which allows the users to connect the axle to the pedal easily.

2. Descriptions of Related Art

Generally, the bicycle pedal and the axle are connected to be a combination by the manufacturers, partly because there are other parts such as bearings, bolts and self-lubrications involved, and all of these parts are difficult for the users to install by themselves.

However, the combination of an axle and a pedal occupies a larger space which is costly for transportation and packing. In other words, the larger space that the goods occupy, the higher fee will be charged for packing and transportation. In order to save the packing and transportation expenses, how to invent a pedal and an axle that are easily assembled by the users becomes an issue to the industry.

The present invention intends to provide a pedal assembly to improve the shortcomings mentioned above.

SUMMARY OF THE INVENTION

The present invention relates to a pedal assembly and comprises an axle and a pedal. The pedal has a passage defined therein, and a shoulder is defined in the inner periphery of the passage. An engaging member is engaged with the passage and the axle rotatably extends through the engaging member. The engaging member has multiple pawls which are engaged with the shoulder.

Preferably, the axle has a grooves defined in the outer periphery of the first end thereof. The engaging member has a contact portion extending from the inner periphery of the first end thereof. The contact portion is engaged with the groove. At least one positioning member is connected to the second end of the axle and contacts the second end of the engaging member.

Preferably, the axle has a threaded section formed on the first end thereof. A flange extends from the outer periphery of the axle and is located between the threaded section and the groove. A first section and a second section are respectively formed along the axial direction of the axle. The first section extends form the groove. The diameter of the first section is smaller than that of the flange, and larger than that of the second section. The engaging member includes a first portion and a second portion formed in the inner periphery thereof. The first portion is an even-diameter portion and mounted to the first section of the axle. The second portion extends from the first portion and has a tapered face and an extension section which extends from the reduced end of the tapered face and is an even-diameter section. The second portion is mounted to the second section, and the extension section contacts the outer surface of the second section.

Preferably, the pawls are formed on the second end of the engaging member and each pawl has an inclined face. A stop face perpendicularly extends from the second end of the engaging member and is connected to the inclined face. The stop face is engaged with the shoulder.

Preferably, the passage includes multiple guide slots defined in the inner periphery of the passage. The shoulder is formed at one end of each of the guide slots.

Preferably, the engaging member has multiple ridges on the outer periphery thereof. The passage of the pedal has multiple paths defined in the inner periphery thereof. The ridges are engaged with the paths.

Preferably, the diameter of the outer periphery of the engaging member becomes smaller from the first end toward the second end of the engaging member. The diameter of the inner periphery of the passage becomes smaller from the first end toward the second end of the passage.

The advantages of the present invention are that the axle, the engaging member, and the positioning member are combined as a set which is connected to the crank. Because the axle is not yet connected to the pedal, so that the width of the bicycle is smaller so as to reduce the space occupied when packing and transportation.

The width of the bicycle is smaller so that the gap between each side of the bicycle and the sidewall of the packing box becomes larger in which more buffering stuff is inserted to stabilize the bicycles in the packing box or the like.

The users can easily assemble the axle set mentioned above and the pedal without any tool or skill.

The pedal is firmly connected to the engaging member and does not separate from the axle.

The users can choose desired peal to be installed to the bicycle.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 5 is a cross sectional view of the pedal assembly of the present invention, and FIG. 6 is an enlarged cross sectional view to show the connection between the engaging member and the axle.

DETAILED DESCRIPTION OF THE PREFERRED EMBODIMENT

Figure 1:
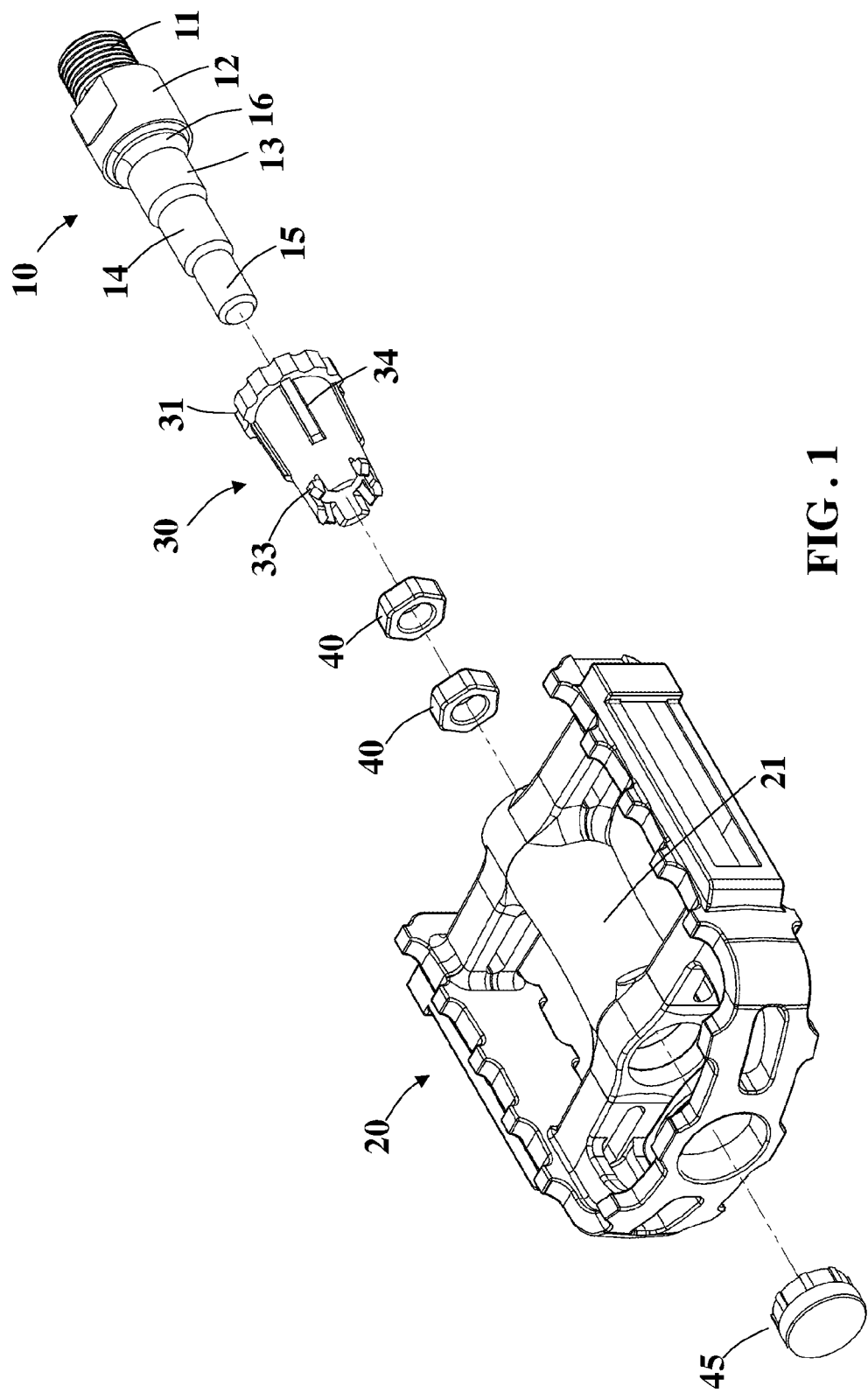
FIG. 1 is an exploded view to show the pedal assembly of the present invention.
Figure 2:
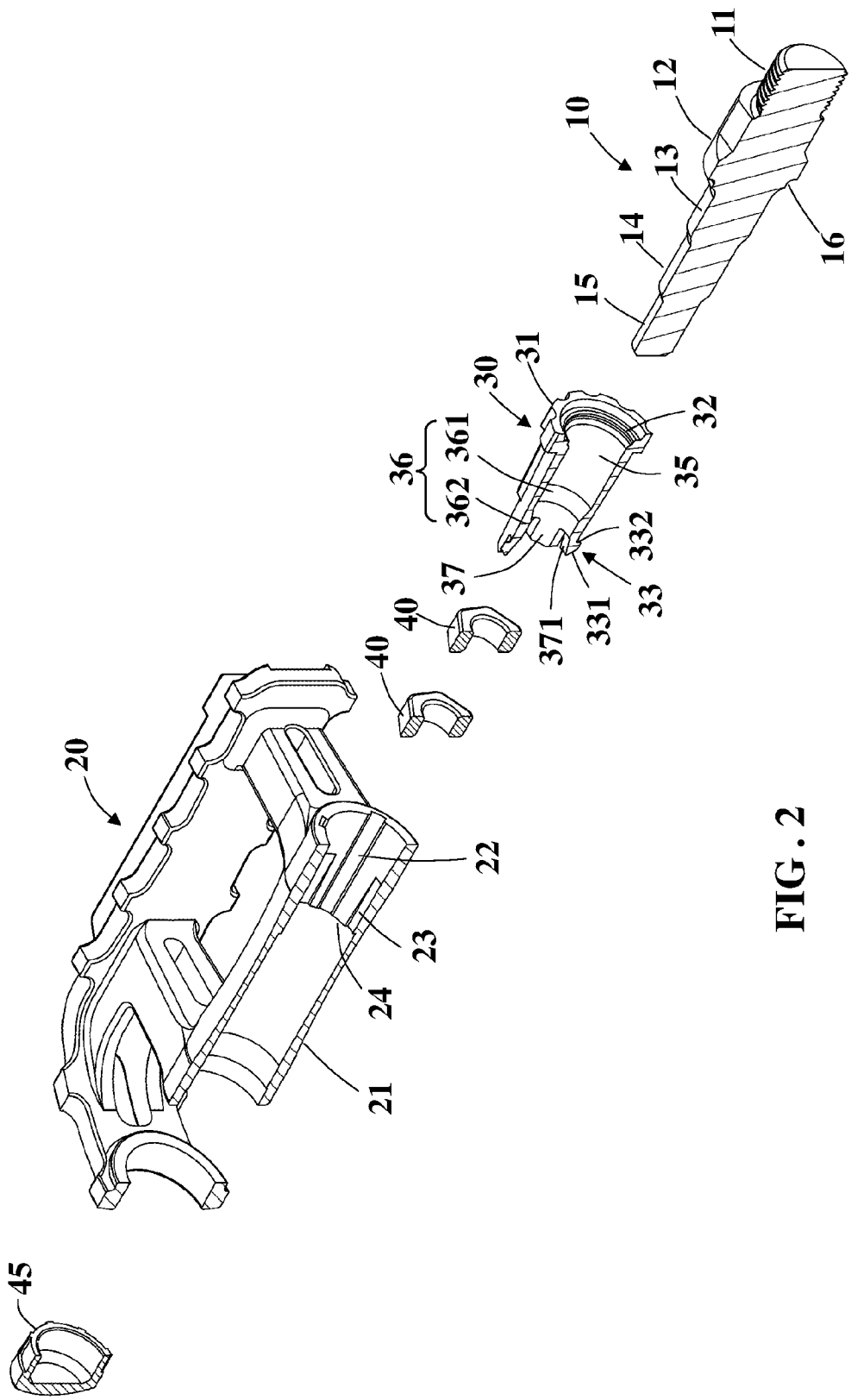
FIG. 2 is a cross sectional view to show the pedal, the axle and the engaging member of the present invention.

Referring to FIGS. 1 to 6, the pedal assembly of the present invention comprises an axle 10 which has a grooves 16 defined in the outer periphery of the first end thereof. A threaded section 11 is formed on the first end of the axle 10 and a flange 12 extends from the outer periphery of the axle 10 and is located between the threaded section 11 and the groove 16. A first section 13, a second section 14 and a third section 15 are formed along the axial direction of the axle 10 in sequence. The first section 13 extends form the groove 12, and the diameter of the first section 13 is smaller than that of the flange 12 and larger than that of the second section 14. The third section 15 is connected to the second section 14 and is located at the second end of the axle 10. The diameter of the third section 15 is smaller than that of the second section 14.

A pedal 20 has a passage 21 defined therein, and a shoulder 24 is defined in the inner periphery of the passage 21. The passage 21 includes multiple guide slots 23 defined in the inner periphery of the passage 21, and the shoulder 24 is formed at one end of each of the guide slots 231.

Furthermore, the passage 21 of the pedal 20 has multiple paths 22 defined axially in the inner periphery thereof.

An engaging member 30 is a sleeve-like member and engaged with the passage 21, and the axle 10 rotatably extends through the engaging member 30. The engaging member 30 has a toothed portion 31 formed on the outside of the first end thereof and a contact portion 32 extends from the inner periphery of the first end of the engaging member 30. Multiple pawls 33 are formed on the second end of the engaging member 30 and engaged with the shoulder 24 when the engaging member 30 is received in the passage 21, so that the engaging member 30 cannot be pulled out from the pedal 20. Each pawl 33 has an inclined face 331, and a stop face 332 perpendicularly extends from the second end of the engaging member 30 and is connected to the rear end of the inclined face 331. The stop faces 332 are engaged with the shoulder 24. The engaging member 30 has multiple ridges 34 on the outer periphery thereof, and the ridges 34 are engaged with the paths 22. The engaging member 30 includes a first portion 35, a second portion 36 and a third portion 37, from the first end of the engaging member 30 to the second end of the engaging member 30, formed in the inner periphery thereof. The first portion 35 is an even-diameter portion and mounted to the first section 13 of the axle 10. The second portion 36 extends from the first portion 35 and has a tapered face 361 and an extension section 362 which extends from the reduced end of the tapered face 361 and is an even-diameter section. The third portion 37 is connected to the extension section 362 and forms an inclined portion 371 on the inside of each of the pawls 33. The second portion 36 is mounted to the second section 14 of the axle 10, and the extension section 362 contacts the outer surface of the second section 14 of the axle 10. Two positioning members 40 are connected to third section 15 of the axle 10 and contact the second end of the engaging member 30. A cap 45 is connected to a bridge portion of the pedal 20 so as to prevent dust from reaching the engaging member 30 and the axle 10.

Figure 3:
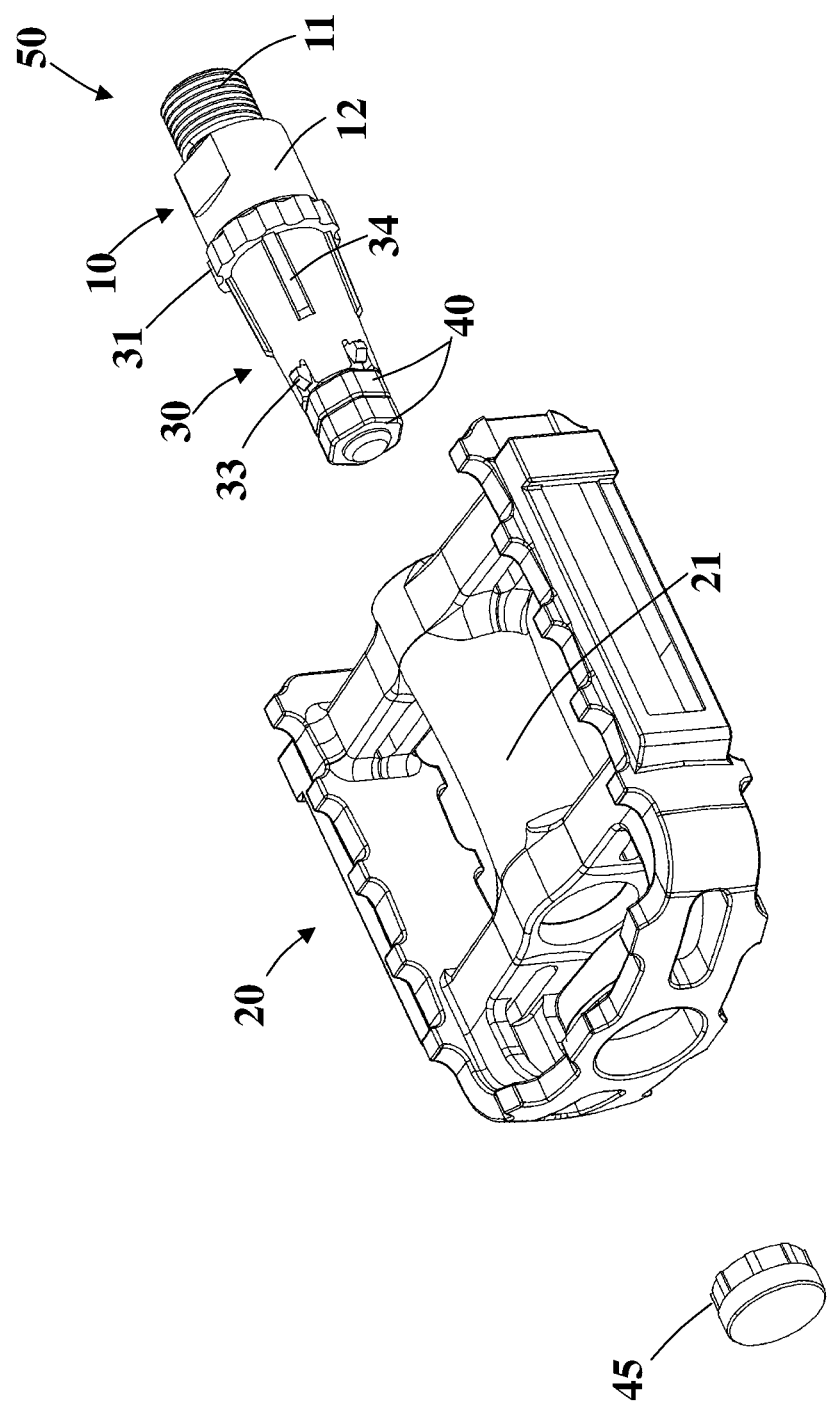
FIG. 3 is an exploded view to show the set of the axle and the engaging member, the pedal and the cap.
Figure 4:
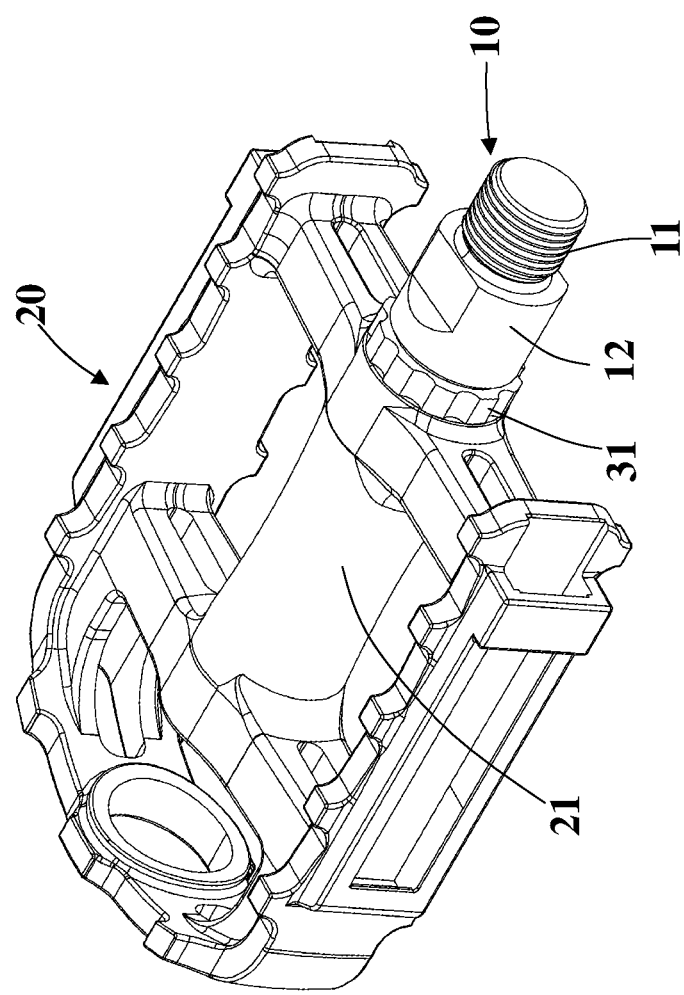
FIG. 4 is a perspective view to show the pedal assembly of the present invention.

When assembling, the axle 10 extends through the engaging member 30, and the positioning members 40 are mounted to the third section 15 to form the axle-engaging member set 50 as shown in FIG. 3. The contact portion 32 of the engaging member 30 is engaged with the groove 16 of the axle 10. The second portion 36 of the engaging member 30 is mounted to and in contact with the second section 14 of the axle 10. The positioning member 40 is mounted to the third section 15. The engaging member 30 is rotatable relative to the axle 10.

When assembling the pedal 20 and the engaging member 30, the ridges 34 are slidably engaged with the paths 22, and the pawls 33 are guided by the guide slots 23. The engaging member 30 is then inserted into the passage 21 of the pedal 20. The inclined faces 331 of the pawls 33 are pushed inward by the inner periphery of the passage 21 until the stop faces 332 pass over the shoulder 24, and the pawls 33 bounce back to engage the stop faces 332 with the shoulder 24. Therefore, the engaging member 30 cannot be pulled out from the passage 21 of the pedal 20. Besides, the diameter of the outer periphery of the engaging member 30 becomes smaller from the first end toward the second end of the engaging member 30, and the diameter of the inner periphery of the passage 21 becomes smaller from the first end toward the second end of the passage 21. Therefore, the engaging member 30 and the pedal 20 are securely connected to each other. The contact portion 32 is engaged with the groove 16 of the axle 10, so that the engaging member 30 together with the pedal 20 are rotatable relative to the axle 10.

It is noted that the axle-engaging member set 50 is easily connected to the crank (not shown) by the threaded section 11, and the users can use a wrench or a proper tool to clamp onto the flange 12 to tighten the axle 10 to the crank.

The manufacturers provide the axle-engaging member set 50 which is not yet connected to the pedal 20 so that the space occupied in the packing box is smaller than the conventional combination including the pedal and the axle on the bicycle. The gap between the sidewalls of the packing box and the bicycle is increased, and more buffering stuff is inserted to stabilize the bicycles in the packing box or the like. The users can easily assemble the axle-engaging member set 50 and the pedal 20 without any tool or skill. The users can also choose desired pedals to be connected to the axle-engaging member set 50.

While we have shown and described the embodiment in accordance with the present invention, it should be clear to those skilled in the art that further embodiments may be made without departing from the scope of the present invention.

What is claimed is:

1. A pedal assembly comprising:
    an axle having a threaded section formed on a first end thereof, a flange extending from an outer periphery of the axle and located between the threaded section and a groove defined in an outer periphery of the first end thereof, a first section and a second section respectively formed along an axial direction of the axle, the first section extending from the groove, a diameter of the first section being smaller than that of the flange, and larger than that of the second section;
    a pedal having a passage defined therein, a shoulder defined in an inner periphery of the passage, and
    an engaging member engaged with the passage and the axle rotatably extending through the engaging member, the engaging member having multiple pawls which are engaged with the shoulder, the engaging member including a first portion and a second portion formed in an inner periphery thereof, the first portion being an even-diameter portion and mounted to the first section of the axle, the second portion extending from the first portion and having a tapered face and an extension section which extends from a reduced end of the tapered face and is an even-diameter section, the second portion mounted to the second section of the axle, the extension section contacting an outer surface of the second section of the axle.

2. The pedal assembly as claimed in claim 1, wherein the engaging member has a contact portion extending from the inner periphery of a first end thereof, the contact portion is engaged with the groove, at least one positioning member is connected to a second end of the axle and contacts a second end of the engaging member.

3. The pedal assembly as claimed in claim 1, wherein the pawls are formed on a second end of the engaging member and each pawl has an inclined face, a stop face perpendicularly extends from the second end of the engaging member and is connected to the inclined face, the stop face is engaged with the shoulder.

4. The pedal assembly as claimed in claim 3, wherein the passage includes multiple guide slots defined in the inner periphery of the passage, the shoulder is formed at an end of each of the guide slots.

5. The pedal assembly as claimed in claim 1, wherein the engaging member has multiple ridges on an outer periphery thereof, the passage of the pedal has multiple paths defined in the inner periphery thereof, the ridges are engaged with the paths.

6. The pedal assembly as claimed in claim 1, wherein a diameter of an outer periphery of the engaging member becomes smaller from a first end toward a second end of the engaging member, a diameter of the inner periphery of the passage becomes smaller from a first end toward a second end of the passage.

\* \* \* \* \*